(12) United States Patent
Winsbury

(10) Patent No.: US 6,951,076 B2
(45) Date of Patent: Oct. 4, 2005

(54) SYSTEM FOR HYDROPONICALLY GROWING PLANTS, APPARATUS AND METHOD THEREFOR

(76) Inventor: Barry Winsbury, 5 Riverside Dr., Ham, Richmond, Surrey (GB), TW10 7QA ( * ) Notice: Subject to any disclaimer, the term of this patent is extended or adjusted under 35 U.S.C. 154(b) by 0 days.

(21) Appl. No.: 10/204,501

(22) PCT Filed: Feb. 21, 2001

(86) PCT No.: PCT/GB01/00745
§ 371 (c)(1), (2), (4) Date: Jan. 15, 2003

(87) PCT Pub. No.: WO01/62074
PCT Pub. Date: Aug. 30, 2001

(65) Prior Publication Data
US 2003/0145519 A1 Aug. 7, 2003

(30) Foreign Application Priority Data
Feb. 22, 2000 (GB) .............................. 0004199

(51) Int. Cl.$^7$ ............................................. A01G 31/00
(52) U.S. Cl. ..................................... 47/62 R; 47/59 R
(58) Field of Search ............................. 47/62 R, 59 R

(56) References Cited
U.S. PATENT DOCUMENTS

| | | |
|---|---|---|
| 3,352,057 A | 11/1967 | Ferrand |
| 4,476,651 A | 10/1984 | Drury |
| 5,193,306 A * | 3/1993 | Whisenant .................. 47/65.8 |
| 5,385,589 A | 1/1995 | Kratky |
| 6,061,957 A * | 5/2000 | Takashima .................. 47/66.1 |
| 6,088,958 A * | 7/2000 | Oka et al. ................. 47/58.1 R |
| 6,216,390 B1 * | 4/2001 | Peregrin Gonzalez ...... 47/62 R |

FOREIGN PATENT DOCUMENTS

| | | |
|---|---|---|
| GB | 2269304 | 2/1994 |
| WO | 97/43896 | 11/1997 |

* cited by examiner

Primary Examiner—Teri Pham Luu
Assistant Examiner—Susan C. Alimenti
(74) Attorney, Agent, or Firm—Andrus, Sceales, Starke & Sawall, LLP

(57) ABSTRACT

The present invention provides a system for growing plants without soil, comprising a container (1) for containing a plant liquid nutrient reservoir; a support unit (2; 22) mounted in the container (1) above the floor thereof and extending substantially horizontally therein for supporting a plant to be grown; a lid for the container provided with a plant growth aperture (13) for the plant to grow up through; means (20; 34) for continuously circulating the plant liquid nutrient and for maintaining flow thereof in association with the support unit (2; 22); means for emptying and charging the plant liquid nutrient reservoir. The invention also includes a method of growing plants utilizing such a system.

10 Claims, 3 Drawing Sheets

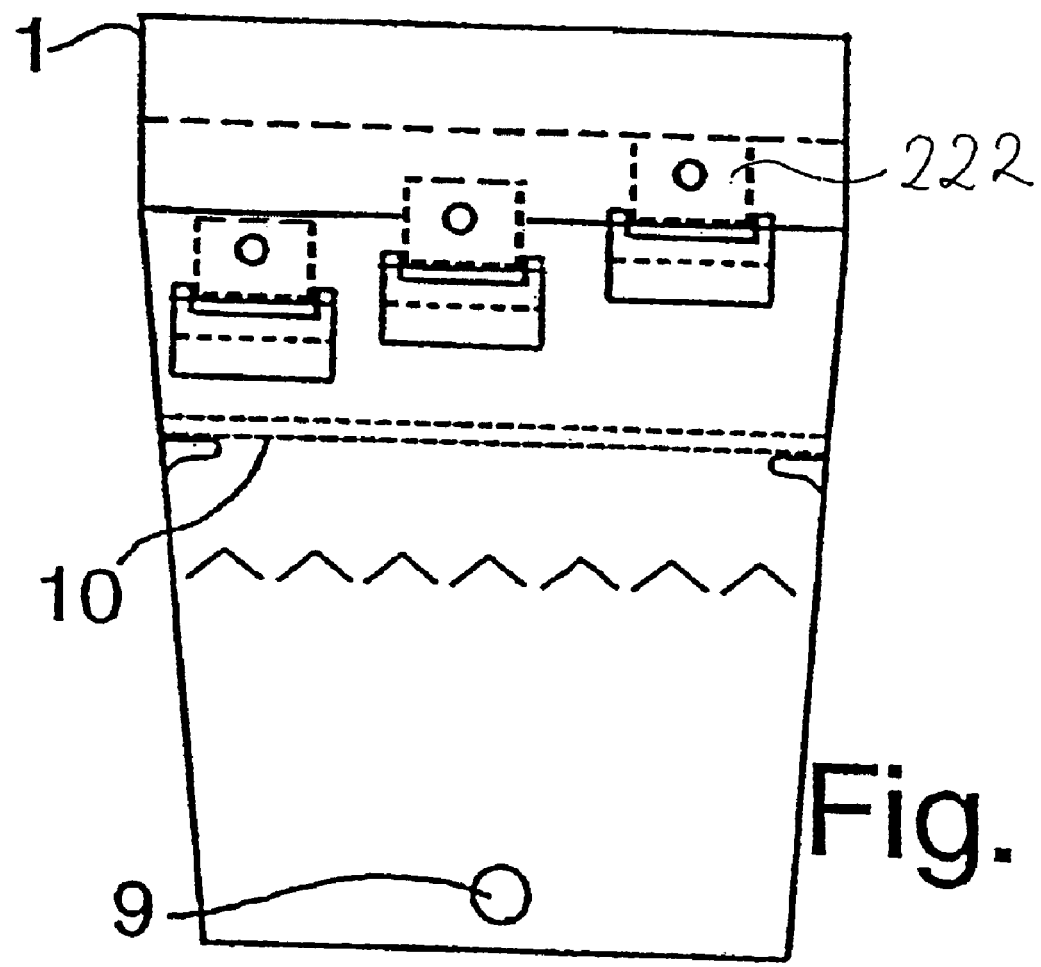

SYSTEM FOR HYDROPONICALLY GROWING PLANTS, APPARATUS AND METHOD THEREFOR

CROSS REFERENCE TO RELATED APPLICATION

The present application is the U.S. national stage application of International Application PCT/GB01/00745, filed Feb. 21, 2001, which international application was published on Aug. 30, 2001 as International Publication WO 01/62074. The International Application claims the priority of British Patent Application 0004199.6, filed Feb. 22, 2000.

FIELD OF THE INVENTION

The present invention relates to a system for hydroponically growing plants, and to an apparatus and method therefor. Hydroponic gardening relates to the growth of plants for aesthetic appeal and/or for food production without the use of soil.

PRIOR ART (BACKGROUND)

Hydroponics has developed from the findings of experiments carried out to determine what substance makes plants grow and the composition of plants. Such work on plant constituents dates back as early as the 1600s. However, plants were being grown in a soil-less culture far earlier than this. Hydroponics is at least as ancient as the Egyptian pyramids. A primitive form has been carried on in Kashmir for centuries. The process of hydroponic growing in our oceans goes back to about the time the earth was created. Hydroponic growing preceded soil growing. But, as a farming tool, many believe it started in the ancient city of Babylon with its famous hanging gardens, which are listed as one of the Seven Wonders of the Ancient World, and was probably one of the first successful attempts to grow plants hydroponically.

Hydroponic gardening probably first became a modem reality around 1940 when the U.S. Army used hydroponic gardening techniques to grow fresh vegetables in the Pacific Islands. NASA was instrumental in advancing the field of hydroponics. They were developing a way to cultivate food in space in the absence of light. One of the major factors was the cost of putting these materials into space. They developed hydroponics systems as they are light, extremely efficient and have high yields. There are a number of fully-fledged hydroponics systems in a number of American nuclear submarines, Russian space stations and various off-shore drilling rigs.

The development of plastics materials freed growers from the costs of constructions associated with the concrete beds and tanks previously used. Beds are now scraped out of the underlying medium and simply lined with a heavy vinyl (20 mm), then filled with growth medium to support the plants. With the development of suitable pumps, time clocks, plastic plumbing and other equipment, the entire hydroponic system can now be automated, or even computerised, reducing both capital and operational costs.

Recently, interest in hydroponics gardening has substantially increased. The reasons for this probably include: firstly some of the major countries of the world continue to have problems producing food under typical conditions—either because of poor weather or poor soil, or both. Secondly, in very populated areas, the availability of land for gardens for the average homeowner is rapidly decreasing. Hydroponic gardening techniques offer the possibility of home-grown food products to the townhouse apartment owner, or the owner of a small home with little land who cannot otherwise have a garden.

There are two main types of hydroponic systems: an open system and a closed system. In the open hydroponic systems, a nutrient solution is periodically fed to the plants supported in an inorganic growth medium. The nutrient solution is drained through the growth medium to the environment. In the closed hydroponic system, the nutrient solution is periodically fed to the plants supported in an inorganic growth medium and then collected and recirculated for further use in later periodic feeling cycles. Closed systems are preferred for being more environmentally friendly, less wasteful of nutrient solution and hence more economic. On the other hand, they suffer from the disadvantage that the recirculated solution deteriorates with each cycle, both in terms of the amount of nutrient available to the plant (which can be topped up) and in terms of the amount of waste products and contaminants that build up, necessitating periodic flushing-out and cleaning of the closed system.

A typical example of a hydroponics system usable in either open or closed forms comprises a plant supporting chamber having an inert growth medium therein; a collection reservoir positioned below the plant supporting chamber; a pump reservoir for containing a nutrient solution; and a valve/connection system delivering the nutrient solution to the plant supporting chamber and for operating the system in either open or closed forms.

However, the presence of the inert, plant growth medium in such hydroponics systems gives rise to problems that have an adverse effect on the system and, in particular, the plant and its growth. Such problems include build-up of inorganic salts or other plant waste, fluctuations in nutrient available, root rot and excessive root growth. Other problems include build-up of algae and widely fluctuating pH of the nutrient solution due to accumulation of waste in stagnant pockets of nutrient solution. Therefore, there is a need for a simple system that avoids these problems, yet that provides an appropriate environment for growing plants without soil.

DISCLOSURE OF INVENTION

Accordingly, the present invention provides a system for growing plants without soil, which system comprises
- (a) a container for containing a plant liquid nutrient reservoir;
- (b) a support unit mounted in the container above the floor thereof and extending substantially horizontally therein for supporting a plant to be grown;
- (c) optionally, a lid for the container provided with a plant growth aperture for the plant to grow up through;
- (d) means for continuously circulating the plant liquid nutrient and for maintaining flow thereof in association with the support unit;
- (e) means for emptying and charging the plant liquid nutrient reservoir whereby a plant seed or bare-rooted plant seedling may be supported in the support unit in the absence of growth medium and may remain in contact with the flow of circulating plant liquid nutrient, thereby growing hydroponically towards the plant growth aperture and growing aeroponically in the environment between the lid and the support unit.

Preferably, the system excludes the practical possibility of adding any plant growth medium for supporting the plants.

Preferably, the circulating means comprising an electrical pump situated on the floor of the container or in a separate housing connected to the container. Suitably, the pump is one selected to operate in the range of from about 60 litres/hour to about 180 litres/hour in the case of a single container system. The pump may be selected so as to be able to circulate air as well as water or other liquid nutrient. The system according to this invention is suitable for both single and multiple use, and for propagating and/or growing plants from seed or bare-rooted cutting.

For propagation purposes, the support unit is preferably trough-like, such as guttering or ducting or arcuate cross section over which the circulating water flows. In this case, the single system preferably has a plurality of plant growth apertures in the lid, whereby a plurality of seeds may be propagated at once. However, for growth beyond the bare-rooted cutting stage, it is preferred that the support unit comprises substantially a conduit, more preferably of square or rectangular cross-section, having therein one or more apertures in the top (in use in the preferred embodiment, lid-facing surface thereof to allow overflow of the circulating water therefrom. Most preferably, the overflow apertures are angular in plan view, and rounded or circular apertures should be avoided to prevent clogging by the plant roots.

The overflow aperture(s) preferably comprise(s) either a slot running laterally along a major part of the length of the support unit or a plurality of smaller slots or rectangular-, such as square-, shaped cut-outs therealong.

In the system for growing plants, rather than for propagating only, the support unit is preferably connected via a plant liquid nutrient conduit to the pump or other circulating means, whereby the plant liquid nutrient may be continuously circulated through the support unit and out via the overflow aperture(s) into the container, from which it is re-circulated to the support unit.

The support system may itself comprise more than one support unit per container. Accordingly, the present invention further provides a system comprising a plurality of support units mounted in the container above the floor thereof and extending substantially horizontally therein for supporting a plant to be grown. The support units may be arranged in a stepped configuration.

Conveniently, there is provided, in association with the support unit, means for emptying it of liquid nutrient. Preferably, such means comprises a support conduit from the inside of the support unit, through a side face of the container, from which the system can be drained. In the case of a system comprising a plurality of containers, the circulating means may be provided in a separate housing and may be linked to each other container via a plurality of plant liquid nutrients conduits that, for example, connect to the support conduit which, in this case, acts as a system fill, rather than a system drainage, conduit. In this case, drainage may be effected, for example, by provision of an outlet towards the base of the container which may itself be linked via one or more drainage conduit(s) to a central reservoir tank, draining tank or (if an open system is desired) to the environment.

In the system according to a preferred embodiment of the present invention, the provision of a lid having minimal aperture dimensions when in use is an important feature, since this allows the plant(s) to grow aeroponically in the moist air that will accumulate, in use, in the environment between the support unit and the lid. If the lid apertures are too large, then the moisture will escape and plant growth will not be as effective. Accordingly, where necessary, plugs may be provided for the lid apertures, particularly if the lid comprises a fill aperture for charging the container with plant liquid nutrient. For similar reasons, the plant growth aperture may be provided with means for closing any gaps in the aperture between the plant and the surrounding lid. Preferably, the system is sealed when in use.

In use, the lid may be positioned substantially horizontally in the top of the container(s) or may be adapted to be placed angularly therein, particularly in the case where a stepped or shelving additional support is associated with the support conduit. Accordingly, the faces of the container(s) are appropriately sized, and the upper vertices thereof may be angled to accommodate stepped or shelved additional support means.

Particularly in the case of an elongate container, there may be more than one lid per container in the system.

As well as the lid, the support unit is another important feature of the system according to this invention. In prior art systems, the plants are supported by a growth medium comprising rockwool or the like, which gives rise to many of the problems mentioned hereinbefore. However, no such growth or support medium is required in the present system for successful plant growth from seed through bare-rooted seedling to immature plant (leaves, stem, roots) and finally fully-mature, such as flowering or fruiting, plant. It has been found surprisingly, that the support unit, with liquid nutrient flowing therethrough, provides excellent physical support for the growing plant, whose root system increasingly adapts to wrapping around the unit, thereby anchoring the plant in the container. The weight of the growing plant is therefore borne by the support unit. If desired, optionally, a water-permeable or penetrable covering may be provided over the overflow aperture(s) on the support unit, such as a covering of synthetic, polymeric material, such as a polyester/nylon woven sheet, such as is sold under the trade name TERRAM, to aid anchorage.

Since no growth/support medium is required, the roots do not rot when the plant reaches the end of a growing cycle (eg finishes flowering), and removal of the plant does not cause damage to the root system, which is particularly advantageous in the case of edible roots or roots that may otherwise be commercially important. In the case of edible roots, such as tubers or the like, an additional root support may be provided below the support unit in order to take the weight of such root vegetables as potatoes, swedes and the like. This additional root support may comprise a hammock of a water-permeable or penetrable covering of the same or a similar material as that described above for the optional support unit covering, slung underneath the support unit and suspended from each end thereof. Alternatively or as well, the support unit may further comprise additional support means in the form of stepped or shelving elements, extending downwardly from the base of the support unit. Such stepped or shelved support means may comprise substantially horizontal and flat shelves or platforms, or may comprise gutter-like support means for the foot system.

The support unit(s) for use in the container(s) comprising the system according to this invention therefore preferably comprise at least one conduit for the flow-through of the plant liquid nutrient having aperture(s) in an upwardly- or lid-facing (in use) surface thereof, and optionally other plant-supporting surfaces in association with said conduit.

The plant liquid nutrient for use in the system of this invention may comprise water only, or a mixture of water and a conventional or known plant liquid feed or liquid fertiliser. For propagation and the early stages of plant growth from seed or bare-rooted cutting, water alone may suffice. Whereas in prior art systems, emptying of the system and recharging with nutrient is required and cumbersome, in the present system, the liquid feed can simply be administered alone or in aqueous solution to the container or tank reservoir without the need for drainage. Repeated emptying and recharging of this system is not necessary, as it is clean, simple to use, and adaptable to each stage of the plant's life cycle.

It has also been found, surprisingly, that, in addition to ease of handling, growth of plants in the system according to the invention is accelerated compared to that using conventional soil methods. For example, sweetcorn (maize) planted about 5 cm below ground will normally take about a week to appear above the surface, whereas the same stage is reached in about 48 hours using the system according to the invention, and in about 5 days the sweetcorn has grown equivalent to about 3 weeks in the soil. Other advantages include the quality of the plants produced by the system according to the invention being superior to those grown by other methods. In particular, we have observed that the leaves of strawberry plants grown in our system are consistently fatter and juicer than seedlings seen in garden centers.

The present invention therefore further provides a method for growing plants without soil, which method comprises (a) placing a plant, such as a seed or seedling, in the absence of plant growth medium on a plant support unit of a system according to this invention;

(b) charging the container with sufficient plant liquid nutrient to enable circulation thereof and to maintain flow therefor in association with the support unit;

(c) preferably, fitting the lid to the container; and (d) activating the circulating means.

Optionally, the method may further comprise (e) topping-up the container with further plant liquid nutrient and/or a different liquid nutrient.

BRIEF DESCRIPTION OF THE DRAWINGS

The present invention will now be described by way of example only, with reference to the accompanying drawings in which FIG. 1 is a perspective view of a single container of a multiple container system according to a first preferred embodiment of the invention wherein

FIG. 2 is a vertical cross-section through the system of FIG. 1, wherein

FIG. 3 is a plan view of the system of FIG. 1, wherein

FIG. 6 is a section corresponding to FIG. 2B showing the support units arranged in stepped configuration.

BEST MODE FOR CARRYING OUT THE INVENTION

Figure 1A:
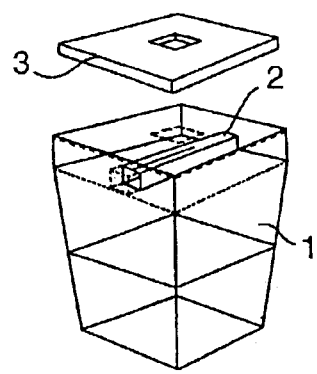
FIG. 1A is a partly-exploded view through the container with lid raised.

Referring to FIGS. 1 to 4: one embodiment of the invention is for use in growing a single plant comprising a container (1) of heavy duty plastics, which has been blow-molded using conventional technology. Alternatively, the container may be of any material suitable for the purpose, such as terracotta, pottery, concrete, brick or the like. Within the container (1), leaving a margin between it and the lid (3) when in use, a support unit (2) is mounted on solid supports (6, 7) on opposing walls of the container (1). The support unit (2) is made e.g. from ABS plastic and spans the width of the container (1) between opposing walls thereof; forming a square-section, hollow bar. One end of the support unit (2) is connected to a support pipe (5) to which may be connected (not shown) either a tap or other drainage system for emptying the system when the container is to be used as a stand-alone, single plant system or a fill connector or other supply system leading to the liquid nutrient reservoir/pumping station when the container is to be used as part of a multiple-container system. At the opposite end, in a side-wall of the support unit (2), is a nozzle (8), which may be either plugged or blank, or to which a feed pipe (not shown) may be connected in the case of a stand-alone, single plant system. Just above the floor of the container (1), in a side-wall thereof, is a further nozzle (9) for connecting the container via a connector system (not shown) for drainage to other container(s) when used as part of a multi-container system or may be plugged in the case of a stand-alone single container system.

Figure 1B:
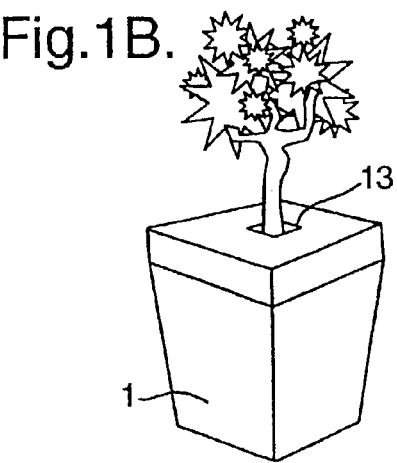
FIG. 1B is a perspective view of the system in use.
Figure 2A:
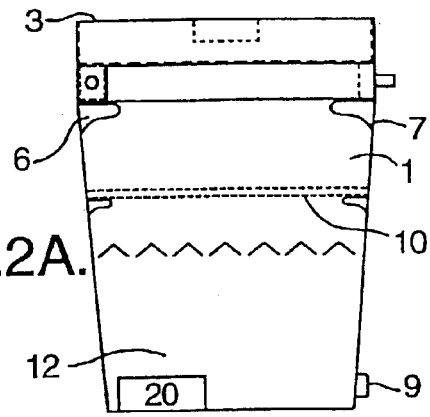
FIG. 2A is a section depicting a sectional side view of the support unit.
Figure 2B:
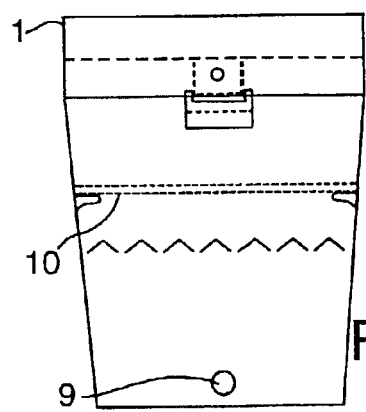
FIG. 2B is a section depicting a sectional end view of the support unit.
Figure 3A:
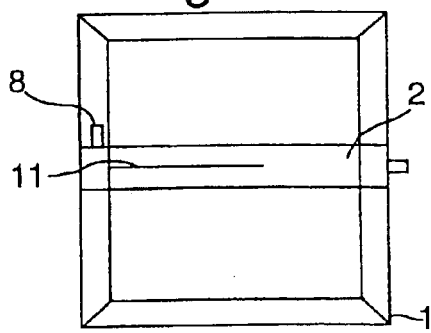
FIG. 3A shows the lid open/absent.
Figure 3B:
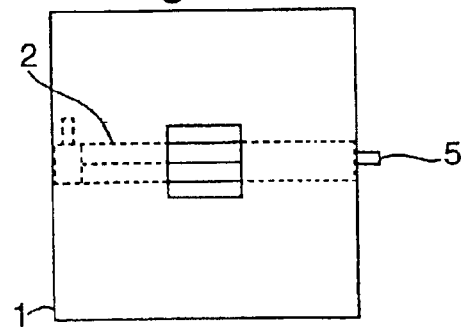
FIG. 3B shows the lid in place.
Figure 4:
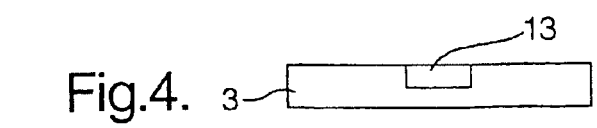
FIG. 4 is a side elevation of the lid of the system of FIGS. 1 to 3.

Also provided is a shelf (10), shown only in FIG. 2, for supporting e.g. tubers and the like underneath the support unit (2). In the top of the support unit (2) is a slot (11) extending about two-thirds of the way along its length across the container (1) whereby, in use, the water or other liquid feed (12) provided in the container 91) may flow through the support unit (2) either via connector (8) or via support pipe (5) and overflow from the slot (11). In the case of the stand-alone, single container system, the connector (8) connects via a conduit/piping to an electrical pump (20) (shown schematically only) positioned on the floor of the container. The lid (3) is sized to fit snugly and water-tightly into the top of the container (1) and has an aperture (13) therein for the plant to grow up through, as illustrated in FIG. 1B. The aperture (13) occupies a central position in the lid (3) of a single plant container, above the support unit (2) and the slot (11) therein.

Figure 5:
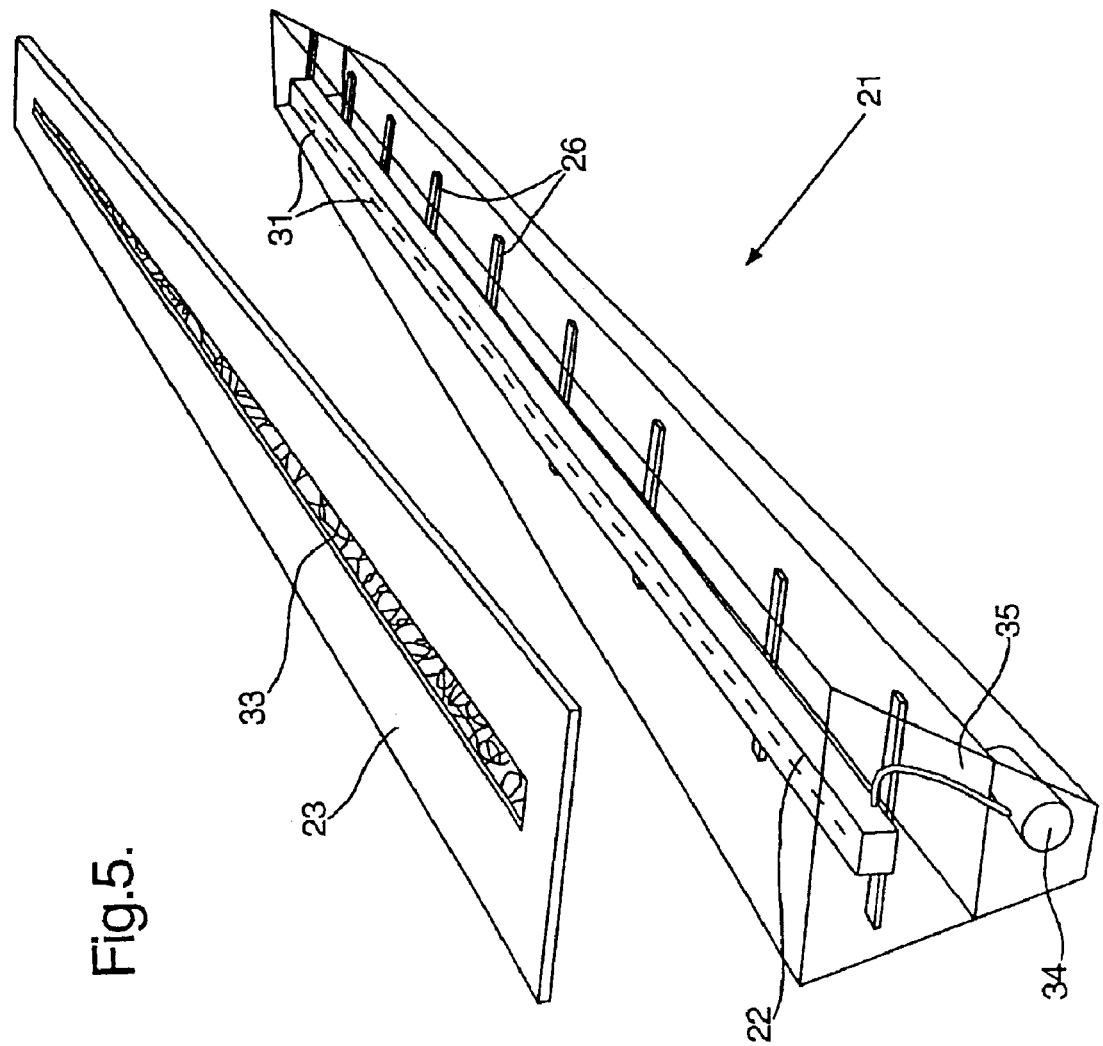
FIG. 5 is a partially-exploded perspective view of a multiple plant, single container system according to a second preferred embodiment of the invention, with the lid raised.

Referring now to FIG. 5, illustrating a multi-plant, elongate container (21), the support unit (22) requires additional transverse mounts (26) that extend within the container (21) at regular intervals. In this embodiment, the overflow is provided by multiple slots (31), also at regularly-spaced intervals along the length of the container (21). A pump (34) is placed on the floor at one end of the container (21) and is connected via flexible piping (35) to the support unit (22). An elongate lid (23) is provided with an elongate slot (33) along substantially all of its length for the plants to grow up through (not shown). The container may be filled through the lid aperture (33). This container (21) may also be adapted, as described for the embodiment of FIGS. 1 to 4, for multiple container use.

FIG. 6 shows the previously described embodiment of the invention wherein a plurality of support units (222) each extend horizontally across the container (1) in a manner similar to the support unit (2) of the embodiments depicted in FIGS. 1–4. In FIG. 6, the support units (222) are arranged in a stepped configuration at different levels above the base of the container (1) as shown.

What is claimed is:

1. A system for growing plants without soil, the system comprising:

(a) a main container, said main container having an open top and a base providing a plant liquid nutrient reservoir;

(b) an elongate support unit mounted in said main container for physically supporting a plant or plant seed to be grown, said elongate support unit comprising a conduit mounted below said top and above said base to extend substantially horizontally across said main container, said elongate support unit having a top surface providing a support surface for the plant or plant seed, said elongate support unit defining an outer surface spaced inward from said main container to allow the growing plants to wrap around the elongate support unit;

(c) means for continuously circulating a flow of liquid nutrient to said support unit for supplying liquid nutrient to a plant or seed supported by said support unit, said circulating means being arranged to flow the liquid nutrient across said support surface for supplying the plant or seed with nutrient;

(d) means for charging said liquid nutrient reservoir; and (e) a close fitting lid for closing said main container to provide an enclosed space within said main container where a moist atmosphere can accumulate and where a plant or seed can grow, said lid being formed with a plant growth aperture for the plant to grow up through;

(f) whereby in use a plant seed or bare-rooted plant seedling may be supported on said support unit in the absence of growth medium and may remain in contact with the flow of circulating liquid nutrient, so that the roots of the plant seed or seedling wrap increasingly around said support unit to anchor the plant in the container, and the plant seed or seedling grows both aeroponically in the environment between said lid and said support unit and hydroponically towards said plant growth aperture;

(g) wherein said top surface of said elongate support unit has at least one aperture therein to allow overflow of the plant liquid nutrient therefrom.

2. A system according to claim 1 in which said conduit is of substantially square or rectangular cross section.

3. A system according to claim 2 in which said at least one overflow aperture comprises a slot extending longitudinally of said conduit.

4. A system according to claim 2 in which said at least one overflow aperture comprises one of an elongate slot extending along a major part of the length of said conduit and a plurality of short slots or cut-outs running along a longitudinal axis of said conduit.

5. A system according to claim 1, further comprising a water-permeable covering over at least a portion of said support unit.

6. A system according to claim 1, in which said plant growth aperture in said lid is of minimal dimensions for retaining moisture in said main container.

7. A system according to claim 1, in which said main container is trough-like, and said lid and said plant growth aperture are elongate.

8. A system according to claim 1, having a plurality of said support units mounted within said main container above said base, each said support unit extending substantially horizontally across said main container for supporting plants to be grown.

9. A system according to claim 8, in which said support units are arranged in a stepped configuration.

10. A system according to claim 1, further comprising a support conduit connected to the inside of said support unit and arranged to support said support unit within said main container.

* * * * *